United States Patent [19]

Asawa

[11] Patent Number: 5,003,623

[45] Date of Patent: Mar. 26, 1991

[54] BIMODAL INTRUSION DETECTION IN AN OPTICAL FIBER COMMUNICATION SYSTEM USING GRADED INDEX FIBER

[75] Inventor: Charles K. Asawa, Pacific Palisades, Calif.

[73] Assignee: TRW Inc., Redondo Beach, Calif.

[21] Appl. No.: 507,423

[22] Filed: Jun. 16, 1983

[51] Int. Cl.[5] .......................... H04B 9/00; G02B 5/14; G02B 5/172

[52] U.S. Cl. .................................. 455/612; 350/96.15; 455/602

[58] Field of Search ............... 350/96.18, 96.31, 96.15, 350/96.23; 455/602, 606, 610, 612; 250/227, 231; 340/555

[56] References Cited

U.S. PATENT DOCUMENTS

| | | | |
|---|---|---|---|
| 4,070,091 | 1/1978 | Taylor et al. | 350/96.33 |
| 4,217,488 | 8/1980 | Hubbard | 350/96.33 |
| 4,237,550 | 12/1980 | Steensma | 455/606 |
| 4,381,137 | 4/1983 | Berg et al. | 350/96.15 |
| 4,436,368 | 3/1984 | Kech | 340/555 |

*Primary Examiner*—Nelson Moskowitz
*Attorney, Agent, or Firm*—Noel F. Heal; Sol L. Goldstein

[57] ABSTRACT

An intrusion-alarmed optical communication system in which two separate modal groups are launched into a single graded index transmission fiber. The system includes two light sources and a lens to focus the light sources into the transmission fiber. A spatial filter is used to selectively limit the angles of incidence of the light on the fiber, and operates in conjunction with the lens to launch light from one source at appropriate angles and points of excitation to excite higher-order modes in the fiber, and to launch light from the other source at appropriate angles and points of excitation to excite lower-order modes in the fiber.

12 Claims, 2 Drawing Sheets

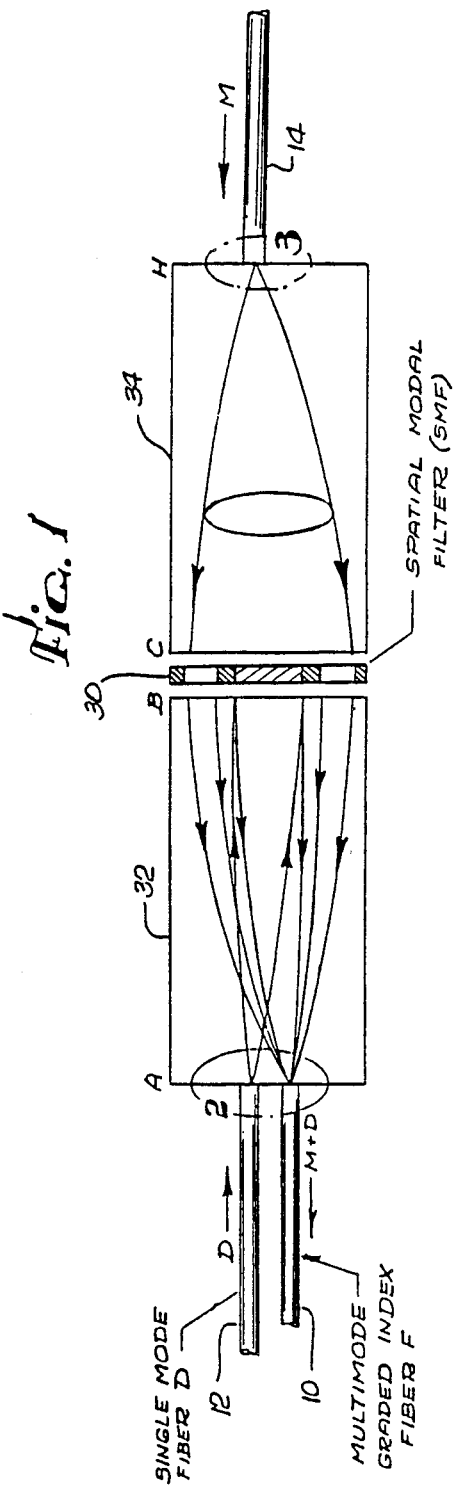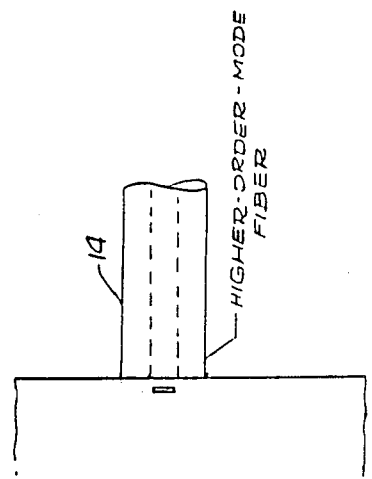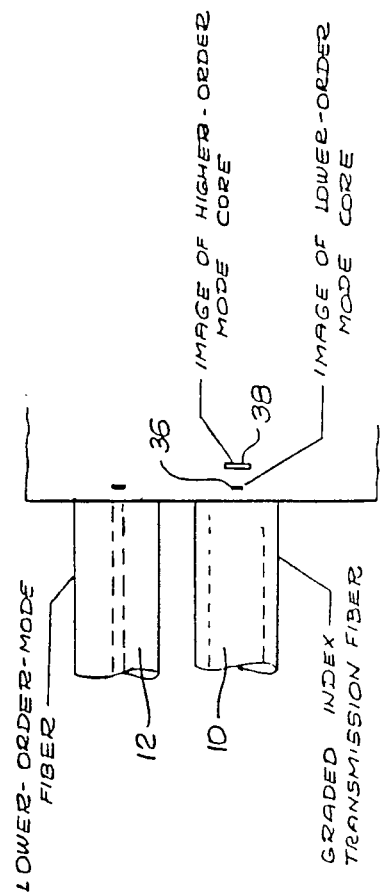

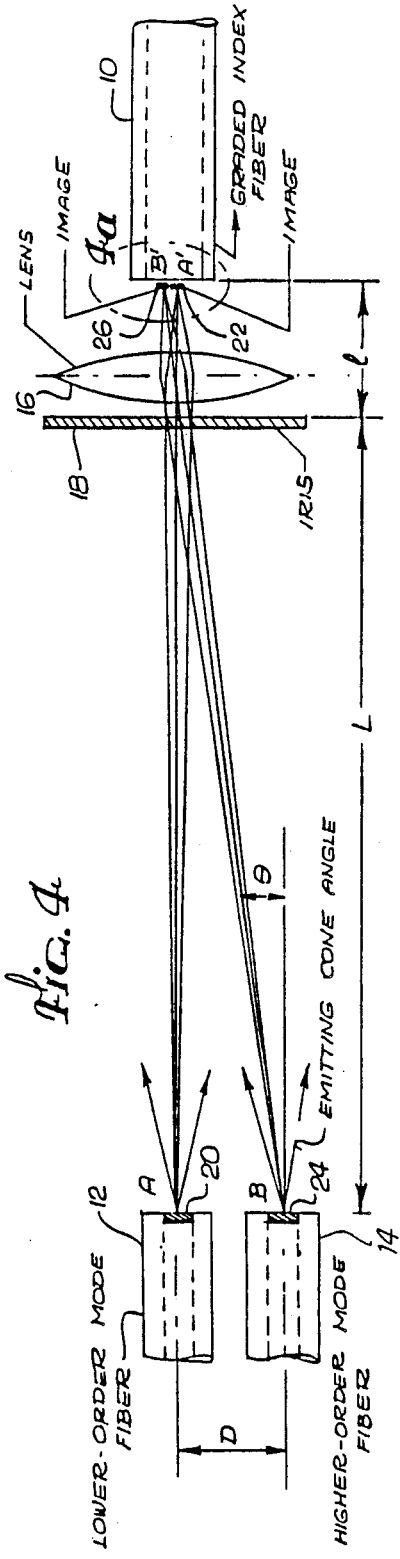

BIMODAL INTRUSION DETECTION IN AN OPTICAL FIBER COMMUNICATION SYSTEM USING GRADED INDEX FIBER

RELATED APPLICATIONS

This application is related to copending applications Ser. Nos. 507,421, 507,422 and 507,424, all filed June 16, 1983, and now abandoned.

BACKGROUND OF THE INVENTION

This invention relates generally to fiber optical communication systems, and more particularly to a specific structure of a fiber optical communication system for carrying light in two different modes or modal groups. An optical fiber is basically a cylinder made of transparent dielectric materials. A central region, referred to as the core, is surrounded by one or more annular cladding regions, which are usually surrounded by a protective jacket. In step-index fibers, the core has a fixed refractive index and the cladding also has a fixed refractive index less than that of the core. In simple terms, light rays launched into the fiber tend to be guided along it because of repeated total internal reflections at the cylindrical boundary between the core and the cladding materials.

Electromagnetic light fields traveling in the fiber or being scattered by the fiber can be considered as superpositions of simpler field configurations, referred to as the modes of the fiber. The mode concept can be expressed in mathematical terms, but for purposes of explanation of the invention, a discussion in terms of geometric optics is more appropriate. Light rays entering a fiber at relatively low angles of incidence with respect to the longitudinal axis of the fiber are referred to as the lower-order modes of the fiber. Rays entering at higher angles of incidence are referred to as the higher order modes.

Rays entering the fiber at sufficiently low angles of incidence are referred to as "guided," since they are totally internally reflected within the fiber. Other rays may be characterized as "unguided," meaning that most of their energy will pass into the cladding and either be absorbed there or radiated out from the fiber. The invention is concerned with guided lower-order modes and with guided higher-order modes. In communication systems, the different modal groups may be used as different information channels. This is a form of multiplexing, in which a group of lower-order modes is used to carry one information signal and a group of higher-order modes is used to carry another information signal.

In one type of bimodal communication system, the higher-order modes are used not to carry useful information, but rather as an intrusion detection device. When a bend of small radius is applied to an optical fiber, some of the light radiates from the core and may be used to decode the information signal being carried by the fiber. One technique for detecting such intrusion is to use the higher-order modes to carry a signal referred to as a masking signal or a monitor signal. If a fiber is bent to cause radiation of the transmitted light, the higher-order modes will radiate from the fiber core to a much greater degree than the lower-order modes. Monitoring the power ratio between higher-order and lower-order modes at the receiving end of the fiber allows detection of intrusion of this type. Optical fiber links employing this principle are referred to as bimodal intrusion alarmed links.

It is essential in such a bimodal multiplexing arrangement that separate light signals be launched as lower-order and higher-order modal groups. Any crosstalk between the two modal groups will render them ineffective for multiplexing purposes. In the past, the only technique for launching bimodal signals into a single fiber was to launch a lower-order-mode signal from a light source disposed on the central axis of the fiber, and to launch a higher-order-mode signal from a light source displaced from the axis, to provide higher angles of incidence. Unfortunately, in such an arrangement it is difficult to control with any precision the amounts of light that are launched at various angles into the fiber. For example, some of the light from the centrally located source will be launched as higher-order modes in the fiber if the core-cladding interface of the fiber is not a perfect step index.

It will be apparent that these problems are further aggravated if instead of a step-index transmission fiber, a graded index fiber is used. A graded index fiber is one in which there is no well defined boundary between the core and cladding regions of the fiber. Instead, the refractive index of the fiber material gradually decreases from the central axis to the outer radius of the fiber. In one commonly available graded index fiber, the refractive index varies with the radial distance in a parabolic manner. Because of the difficulties of launching bimodal signals into transmission fibers, and adequately maintaining the integrity of two separate modal groups, bimodal optical fiber links have never employed graded index transmission fibers, which would apparently aggravate the launching difficulties. However, step-index fiber for use in bimodal fiber links is relatively expensive to manufacture, mainly because it is made in small quantities compared with other types of fiber.

SUMMARY OF THE INVENTION

The present invention resides in a bimodal optical fiber communication system in which the transmission fiber is a graded index fiber. Use of the graded index fiber results in a substantial reduction in the cost of the system, without any sacrifice in performance.

Briefly and in general terms, the communication system of the invention includes a first light source, to provide lower-order-mode light, a second light source, to provide higher-order-mode light, a graded index transmission fiber into which light from both the first and second light sources is to be launched, spatial filter means to selectively limit the angles of incidence of light on the graded index transmission fiber, and lens means. The lens means functions to focus the first and second light sources into an end of the graded index transmission fiber, at selected angles of incidence and excitation points, to enable launching of light from the first and second sources into the transmission fiber as lower-order modes and higher-order modes, respectively.

More specifically, the first light source is focused into the transmission fiber as a relatively small image at the central axis of the fiber, such that the angles of incidence and the radial locations of points of excitation will be small enough to enable launching the light in the form of lower-order modes. The second light source is focused into the transmission fiber as an image located at least in part at greater radial distances from the central axis than the image of the first light source, and having angles of incidence greater than those associated with the image of the first light source, such that the angles of incidence and the locations of points of excitation are appropriate to launching the light in the form of higher-order modes.

Although the invention has been summarized thus far in terms of a transmitter of light signals, the same structural combination can function as a receiver and separator of multi-modal light signals. Only the direction of light transmission is reversed, and the light sources are light detectors.

In one preferred mode of the invention, the first light source is located on the central axis of the transmission fiber, and the spatial filter means includes an aperture located on the central axis of the transmission fiber. The lens means includes a convex lens located adjacent to the spatial filter means and between the first light source and the transmission fiber, to image the first light source onto the transmission fiber at a central location and with small angles of incidence. In this embodiment, the second light source is displaced to one side of the central axis of the transmission fiber, and light from the second light source is limited by the aperture to a small cone of rays, and is imaged onto the transmission fiber at greater angles of incidence than the light from the first light source, and at a location displaced from the central axis.

It will be appreciated from the foregoing that the present invention represents a significant advance over bimodal fiber communication links of the prior art. In particular, the invention provides a structure for launching two modal groups into a graded index transmission fiber, the cost of which is considerably less than a step-index fiber for the same purpose. Other aspects and advantages of the invention will become apparent from the following more detailed description, taken in conjunction with the accompanying drawings.

BRIEF DESCRIPTION OF THE DRAWINGS

FIG. 1 is a diagrammatic view of one embodiment of the invention;

FIG. 2 is an enlarged fragmentary view of a portion of the FIG. 1 structure, showing the relative sizes of a lower-order-mode input fiber, graded index transmission fiber and images of the lower-order-mode and higher-order-mode light sources;

FIG. 3 is an enlarged fragmentary view of another portion of the FIG. 1 structure, showing a higher-order-mode input fiber and light source;

FIG. 4 is a diagrammatic view of another embodiment of the invention;

FIG. 5 is a graph showing, for the higher-order modes, the relationship between numerical aperture and the relative location of the point of excitation in the transmission fiber; and FIG. 6 is a graph similar to FIG. 6, showing the same relationship for the lower-order modes.

DESCRIPTION OF THE PREFERRED EMBODIMENTS

As shown in the drawings for purposes of illustration, the present invention is concerned with bimodal optical fiber communication systems. In such systems, light from two separate light sources is launched into a single transmission fiber. Light from one source is launched as lower-order modes, i.e. with relatively small angles of incidence with resect to the central axis of the transmission fiber, while light from the other source is launched as higher-order modes, i.e. with relatively large angles of incidence. In the past, the lower-order light source has been disposed on the axis of the transmission fiber and the higher-order light source displaced from the axis, in an effort to provide adequate separation of the modal groups. The prior technique uses quasi-plane wave excitation, and a step-index transmission fiber is employed.

In accordance with the invention, light from two separate light sources is launched into a graded index transmission fiber by means of a lens system that ensures excitation at appropriate angles of incidence and excitation points, to enable separation of the two modal groups. FIG. 4 shows one embodiment of the invention, including a graded index transmission fiber, indicated by reference numeral 10, a first input fiber 12, providing light to be launched as lower-order modes, and a second input fiber 14, providing light to be launched as higher-order modes.

The novel structure also includes a convex lens 16 located relatively close to the transmission fiber 10, with the optical axis of the lens aligned with the central axis of the fiber, an iris or apertured plate 18 located adjacent to the lens, with the center of the aperture aligned with the axis of the lens and the fiber. The lower-order input fiber 12 is also disposed on the optical axis, and light from the input fiber 12 is apertured by the iris 18 and focused by the lens 16 into the end of the transmission fiber 10.

The first source of light, indicated at 20, provided by the end of the core of input fiber 12, is focused into a smaller image 22 at the end of the transmission fiber 10. The image 22 occupies a central space of relatively small radius. Accordingly, the light from the first source 20 is launched into the transmission fiber 10 at relatively small angles of incidence, and the points of excitation are at small radial distances from the axis. Thus the light from the first source 20 is launched as lower-order modes.

In a graded index fiber, the mode of excitation of the fiber depends not only on the angle of incidence of the light, but also on the radial distance between the point of excitation and the axis of the fiber. Light rays having the same angles of incidence but impinging at different points of excitation will result in different modes. In general, increasing either the angle of incidence or the radius at the point of excitation will result in excitation of a higher-order mode. The mathematical relationship of these variables is discussed in more detail in relation to FIGS. 5 and 6.

The second input fiber 14 is shown as displaced from the axis of the transmission fiber 10 by a distance axis of the transmission fiber 10 and a central ray from the second light source 24 is designated $\theta$ in FIG. 4, and it will be apparent that $\tan \theta = D/L$, where L is the distance between the lens 16 and the light source 24. Moreover, light rays from the second source 24 will reach the transmission fiber 10 at angles close to $\theta$, and the mean radial distance of the image 26 is given by $D1/L$, where 1 is the distance between the lens 16 and the plane of the image 26. If this radial distance and the angle $\theta$ are appropriately selected, light from the second input fiber 14 will be launched as higher-order modes in the transmission fiber 10.

It will be understood that the input fibers 22 and 14 could be replaced by other light sources, such as laser diodes or light emitting diodes, without departing from the principle of the invention. In some configurations, it might be desirable to include a second lens positioned near the light sources, to collimate the light before spatial filtering and focusing by the iris 18 and lens 16.

A second embodiment of the invention is shown in FIGS. 1-3, in which a spatial modal filter 30 is used to provide control over the angles of incidence of the light launched into the transmission fiber, referred to by the same reference numeral 10. The principles of operation of this configuration are described in detail in a related patent application by S. Yao et al. entitled "Device and Method for Modal Separation and Combination in an Optical Fiber Intrusion Detection System," filed concurrently with the present application. The related application of S. Yao et al. is incorporated by reference into this specification, and a copy is filed as an appendix to this specification, so that it will remain in the patent file and be more readily available to the public.

Briefly, the spatial modal filter 30 includes a central reflective disc, and it is disposed between two lenses 32 and 34, shown as graded-index fiber lenses, but nevertheless having the properties of conventional bi-convex lenses. Light from the first input fiber 12 is first collimated by the first lens 32, then reflected by the spatial modal filter, and focused onto the end of the transmission fiber 10 as a relatively small central image 36 (FIG. 2). Thus, light from the first input fiber 12 is launched into the transmission fiber 10 as lower-order modes, since both the angle and radius of the excitation points are relatively small.

The second fiber 14 in the FIG. 1 embodiment is located such that light form this fiber is first collimated by the second lens 34. Light from the second input fiber 14 can reach the first lens 32 only by passing around the periphery of the reflective disc of the spatial modal filter. This light is focused by the first lens 32 onto the end of the transmission fiber 10, forming an image 38 (FIG. 2). The image 38 is of larger average radius than that of the image 36 of the first light source. Also the spatial modal filter 30 limits the light rays forming the second image 38 to impinge at higher angles of incidence than the rays forming the first image 36. Accordingly, light from the second input fiber 14 will be launched as higher-order modes.

It will be appreciated that the invention as illustrated in terms of a bimodal transmission system is also operable as a bimodal receiver and separator. Only the direction of light transmission is changed, and the input fibers 12 and 14 become output fibers, for connection to light detectors.

The basic equation connecting modal group, excitation angle, and point of excitation is given by:

$$\left(\frac{m}{M}\right)^{\frac{2\alpha}{\alpha+2}} = \frac{\sin^2\theta}{\sin^2\theta_c} + \left(\frac{r}{a}\right)^\alpha \quad (1)$$

where:
m = modal group number (from 1 to N),
$\alpha$ = index profile parameter for graded index transmission fiber 10,
$\theta_c$ = critical axial angle of fiber,
$\theta$ = axial angle of ray,
a = fiber core radius, and
r = radius of excitation point.

Equation (1) is given in Chapter 1, p. 35 of the text "Fundamentals of Optical Fiber Communications," 2nd edition (N. K. Barnoski, ed.), Academic Press, N.Y., 1981.

For a graded index fiber with a parabolic index profile, $\alpha$ is equal to 2, and equation (1) reduces to:

$$\frac{m}{M} = \left(\frac{\sin\theta}{\sin\theta_c}\right)^2 + \left(\frac{r}{a}\right)^2 \quad (2)$$

It will be seen from equation (2) that, if r/a is plotted along the x axis and sin $\theta$/sin $\theta_c$ is plotted along the y axis, for a given value of mode m the result is a circular curve of radius $(m/M)^{\frac{1}{2}}$. FIG. 5 shows this in graphical form for the higher-order modes. For example, if sin $\theta$/sin $\theta_c = 0.8$ and r/a = 0.43, corresponding to point $P_1$ in FIG. 5, the locus of $\theta$ and r values for this modal group is shown by the broken line 40. By measurement from the figure, $(m/M)^{\frac{1}{2}} = 0.908$, so that the modal group excited is m = 0.825M. The shaded region of FIG. 5 indicates the bound meridional modes for the "higher-order" modes launched into the transmission fiber. The shaded region covers modal groups with values of modal group ratio (m/M) from 0.64 to 1.0. The area further out from the shaded region represents radiation modes. The area closer to the origin than the shaded region represents modes of lower order than those in the shaded region. For a value of sin $\theta$/sin $\theta_c = 0.8$, the value of r/a can be in the range 0 to 0.6. It will be seen that the higher-order modes represented by the shaded region of FIG. 5 can be launched by appropriate selection of ray angles and points of excitation.

FIG. 6 is a graph similar to FIG. 5, but showing typical values of radius and launch angle for lower-order modal groups. The figures given assume that the lower-order modes are supplied from a single-mode fiber of core radius 5 microns and numerical aperture of 0.042, and that these radius and angle values are maintained at the image plane in the transmission fiber, by the use of symmetrical optics such as are shown in FIG. 1. It is also assumed that the transmission fiber 10 has a value of $\theta_c$ of 0.21 radians. Accordingly, (sin $\theta$/sin $\theta_c)_{max} = 0.042/0.21 = 0.2$, and $(r/a)_{max} = 5/25 = 0.2$.

The point corresponding to these maximum radius and maximum angle values is shown at 42 in FIG. 6, and the corresponding modal group ratio is obtained as:

$(m/M)^{\frac{1}{2}}_{max} = 0.2 \ (2)^{\frac{1}{2}}$, or $(m/M)_{max} = 0.080$.

The shaded area shows the area with allowable values of radius and angle yielding a range of modal group ratios (m/M) from zero though 0.080.

It will be appreciated from the foregoing that graded index transmission fibers can be used for bimodal communications, so long as an appropriate lens system and spatial filter are used to limit the angles and points of excitation to selected ranges giving rise to lower-order modes and higher-order modes, respectively. The required ranges of angles and points of excitation can be obtained without much practical difficulty once the relationships between modal groups and the angle and radius of excitation points are understood. It will also be appreciated that, although specific embodiments of the invention have been described in detail for purposes of illustration, various modifications may be made without departing from the spirit and scope of the invention. Accordingly, the invention is not to be limited except as by the appended claims.

I claim:

1. A bimodal intrusion-alarmed optical fiber communication system, comprising:
   a first light source, to provide a data signal to be launched as lower-order-mode light;
   a second light source, to provide a monitor signal to be launched as higher-order-mode light;
   a graded index transmission fiber into which light from both said first and second light sources is to be launched;
   spatial filter means to selectively limit the angles of incidence of light on said graded index transmission fiber; and
   lense means for focusing said first and second light sources into an end of said graded index transmission fiber, at selected angles of incidence and selected excitation points to enable launching of light from said first and second sources into said transmission fiber as lower-order modes and higher-order modes, respectively, whereby the data and monitor signals can be later compared to detect intrusion.

2. A bimodal intrusion-alarmed optical fiber communication system as set forth in claim 1, wherein:
   said first light source is located on the central axis of said transmission fiber;
   said spatial filter means includes an aperture located on the central axis of said transmission fiber; and
   said lens means includes a convex lens located adjacent to said spatial filter means and between said first light source and said transmission fiber, to image said first light source onto said transmission fiber at a central location and with small angles of incidence.

3. A bimodal intrusion-alarmed optical communication system as set forth in claim 2, wherein:
   said second light source is displaced to one side of the central axis of said transmission fiber; and
   light from said second light source is limited to a small cone of rays by said aperture and is imaged onto said transmission fiber at greater angels of incidenced than the light from said first light source, and at a location displaced from the central axis.

4. A bimodal intrusion-alarmed optical communication system as set forth in claim 1, wherein said first and second light sources include optical fibers, said first light source having an optical fiber of relatively small core size to provide a small image for launching low-order modes into the transmission fiber, and said second light source having an optical fiber of larger core size, to provide a larger image for launching higher-order modes into the transmission fiber.

5. A bimodal intrusion-alarmed optical communication system as set forth in claim 1, wherein said first and second light sources include optical fibers, said first light source having an optical fiber of relatively small core size to provide a small image for launching low-order modes into the transmission fiber, and said second light source having an optical fiber of larger core size, to provide a larger image for launching higher-order modes into the transmission fiber.

6. A bimodal intrusion-alarmed optical communication system as set,;forth in claim 2, wherein said first and second light sources include optical fibers, said first light source having an optical fiber of relatively small core size to provide a small image for launching low-order modes into the transmission fiber, and said second light source having an optical fiber of larger core size, to provide a larger image for launching higher-order modes into the transmission fiber.

7. A bimodal intrusion-alarmed optical communication system as set forth in claim 3, wherein said first and second light sources include optical fibers.

8. A bimodal intrusion-alarmed optical communication system as set forth in claim 1, wherein:
   the higher-order modes have a modal group ratio of between approximately 0.65 and 1.0; and
   the lower-order modes have a modal group ratio of less than approximately 0.08.

9. A bimodal intrusion-alarmed optical communication system as set forth in claim 1, wherein:
   the higher-order modes have a modal group ratio of between approximately 0.65 and 1.0; and
   the lower-order modes have a modal group ratio of less than approximately 0.08.

10. A bimodal intrusion-alarmed optical communication system as set forth in claim 12, wherein:
    the higher-order modes have a modal group ratio of between approximately 0.65 and 1.0; and
    the lower-order modes have a modal group ratio of less than approximately 0.08.

11. A bimodal intrusion-alarmed optical communication system as set forth in claim 3, wherein:
    the higher-order modes have a modal group ratio of between approximately 0.65 and 1.0; and
    the lower-order modes have a modal group ratio of less than approximately 0.08.

12. A bimodal intrusion-alarmed optical communication system as set forth in claim 4, wherein said first and second light sources include optical fibers, said first light source having an optical fiber of relatively small core size to provide a small image for launching low-order modes into the transmission fiber, and said second light source having an optical fiber of larger core size, to provide a larger image for launching higher-order modes into the transmission fiber.

* * * * *